Sept. 12, 1961  E. J. NAUDZIUS  2,999,566
BRAKE SHOE SPRING

Filed Aug. 24, 1959  2 Sheets-Sheet 1

INVENTOR.
Edward J. Naudzius
BY
His Attorney

Sept. 12, 1961  E. J. NAUDZIUS  2,999,566
BRAKE SHOE SPRING
Filed Aug. 24, 1959  2 Sheets-Sheet 2
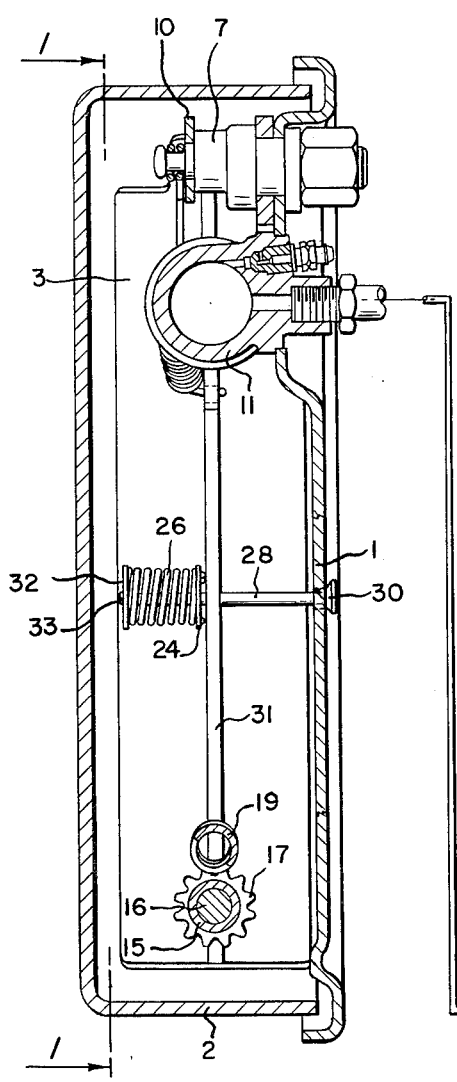
Fig. 2
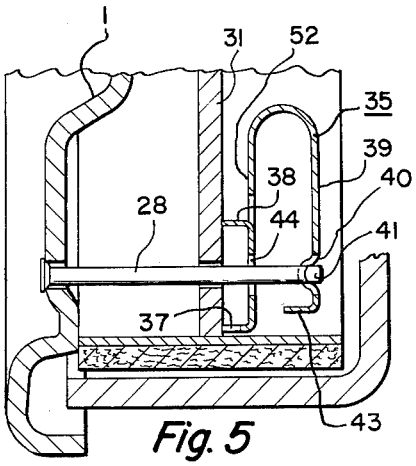
Fig. 5
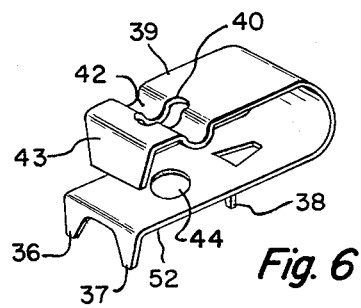
Fig. 6
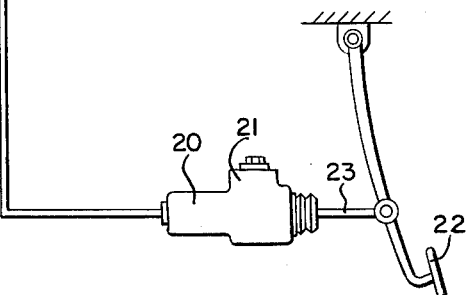
INVENTOR.
Edward J. Naudzius
BY
His Attorney

United States Patent Office 2,999,566
Patented Sept. 12, 1961

2,999,566
BRAKE SHOE SPRING
Edward J. Naudzius, Lathrup Village, Mich., assignor to General Motors Corporation, Detroit, Mich., a corporation of Delaware
Filed Aug. 24, 1959, Ser. No. 835,561
7 Claims. (Cl. 188—78)

This invention relates to a vehicle drum brake and more particularly to a spring and pin assembly for supporting the brake shoes.

In the conventional vehicle drum brake which employs a rotating drum to be frictionally engaged by one or more brake shoes, it is customary to provide a means to prevent rattling and assist in alignment between the brake shoes and the backing plate by a pin and spring assembly. The backing plate also serves as a means for supporting and maintaining the relative positions between the various parts of the braking mechanism. Under severe braking conditions, the brake shoes become overheated and consequently, the pin and spring assembly attached to the brake shoe webbing may also become overheated. Overheating of the spring may cause a certain degree of annealing of the metal thereby causing the spring to lose resilience. Accordingly, this invention is intended to overcome this disadvantage.

It is an object of this invention to prevent overheating of the resilient alignment and anti-rattle means for the brake shoes in a vehicle drum brake.

It is another object of this invention to provide a holddown pin and spring assembly having limited contact between the pin and spring assembly with the brake shoe webbing in a vehicle drum brake.

It is a further object of this invention to provide means for limiting the stress on a compression spring for ease in assembling of the hold-down pin assembly.

The objects of this invention are accomplished by means of a resilient member engaging a pin which is mounted on the brake support member. The resilient member is constructed so that a limited portion engages the brake shoe and thereby retards the heat transfer from the shoe to the spring. A coil spring with a spring seat or a single leaf spring is employed to engage the pin and the brake shoe webbing.

Further objects and advantages of the present invention will be apparent from the following description, reference being had to the accompanying drawings wherein a preferred embodiment of the present invention is clearly shown.

In the drawings:

FIGURE 2 is a cross section view taken on line 2—2 of FIGURE 1.

FIGURE 5 is a cross section view showing the leaf spring resiliently holding the brake shoe in its relative position to the backing plate.

FIGURE 6 is a three-dimensional view of the leaf spring.

Figure 1:
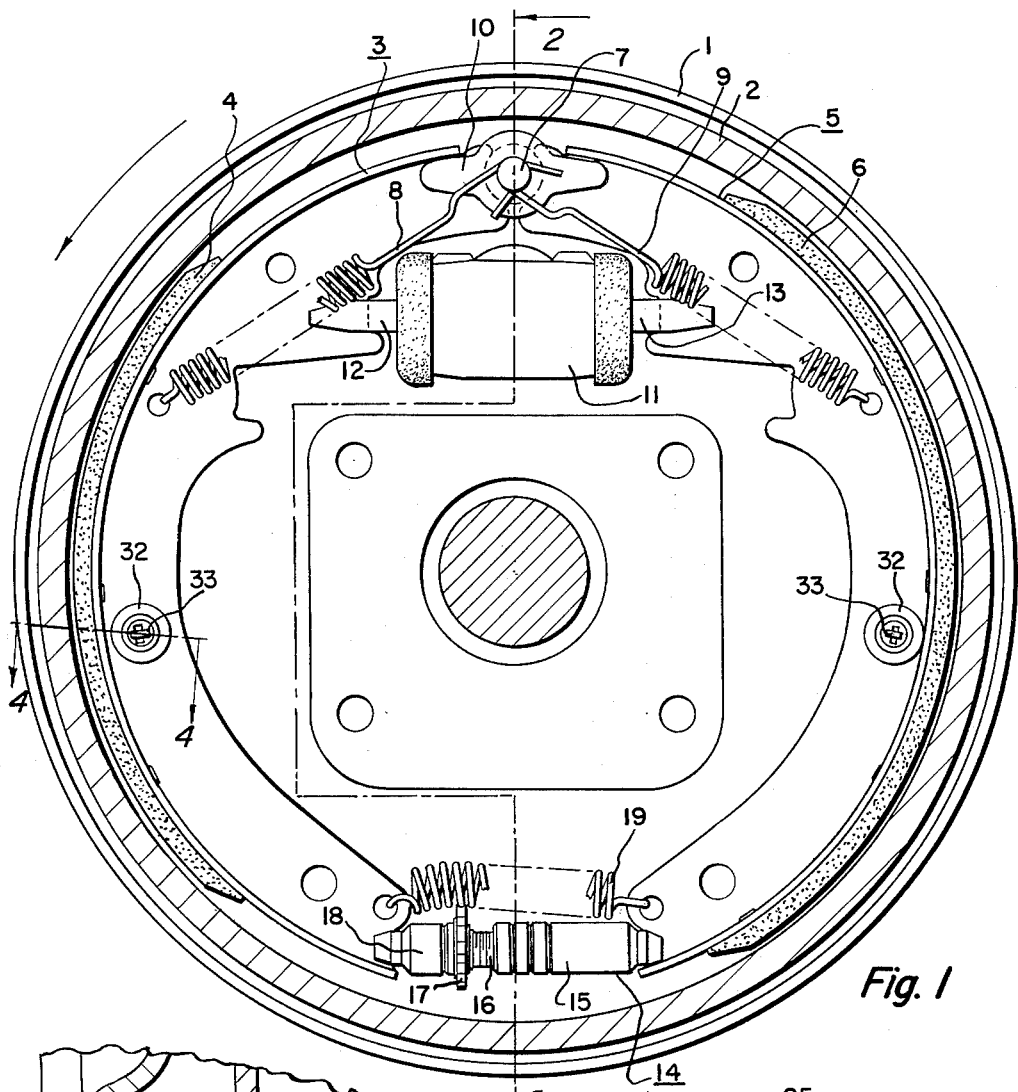
FIGURE 1 shows a cross section of the vehicle brake drum which also shows the relative location of the various parts within the braking structure.

In a conventional vehicle drum brake, the brake shoes are mounted within the rotating brake drum and are resiliently held in contact with the backing plate by means of a hold-down pin assembly. The hold-down pin assembly is shown in its relative position with the other related parts of the vehicle brake structure in FIGURE 1. The backing plate 1 is mounted adjacent to and concentric with the rotating drum 2. The primary brake and shoe 3 is provided with a frictional material 4 for engaging the inner periphery of the drum 2. The secondary brake shoe 5 is also provided with a frictional material 6 for engaging the inner periphery of the drum 2. The anchor pin 7 is mounted on the backing plate 1. Two cooperative adjacent ends of the primary brake shoe 3 and the secondary brake shoe 5 contact the anchor pin 7 when the shoes are in their retracted position. The primary brake shoe 3 is held in its retracted position by spring 8 and the secondary brake shoe is held in its retracted position by spring 9. The springs engage a perforation in their respective shoes and are also connected to the anchor pin 7. A washer 10 is seated on the anchor pin 7 to provide a guiding means of the primary shoe 3 and the secondary shoe 5 as they move relative to the anchor pin 7. The hydraulic fluid actuating means is shown in FIGURE 1. This fluid actuating means includes a wheel cylinder 11 having a push rod 12 for engaging the primary shoe 3 and a push rod 13 for engaging the secondary shoe 5.

The lower two ends of the shoes 3 and 5 are maintained in spaced relation by an adjustable strut 14. The strut comprises a sleeve 15 having a hollow cylindrical portion on its inner periphery for threadedly receiving a screw member 16. The end of the sleeve 15 is slotted for receiving the end of the secondary brake shoe 5. The adjusting screw 16 includes the ratchet wheel 17 for rotating the screw member. The screw member 16 has a smooth cylindrical shank portion for reception within the sleeve 18 which is also slotted for engagement with the primary shoe 3. The constant contact between the two cooperative adjacent ends of the brake shoes 3 and 5 and the adjustable strut 14 is maintained by spring 19.

The wheel cylinder 11 is shown in FIGURE 2 in communication with the master cylinder 20. The master cylinder 20 is also in communication with the reservoir portion 21. A master piston operates within the master cylinder 20 to pressurize fluid within the brake actuating system. A brake pedal 22 serves as a manual means for actuating a master piston through push rod 23.

Figure 3:
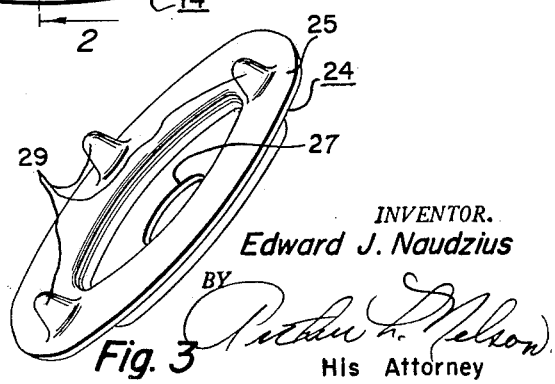
FIGURE 3 is a three-dimensional view of the spring seat shown engaging the brake shoe in FIGURE 4.

FIGURE 3 shows the 3-dimensional view of the coil spring seat 24. The coil spring seat 24 is provided with an annular recessed flange 25 for seating the coil spring 26. The central portion of the spring seat has an opening 27 for insertion of the pin 28. Three embossments 29 are shown on the underside of the seat 24. The spring seat 24 is constructed of sheet metal and the embossments 29 are stamped on the lower portion of seat 24.

Figure 4:
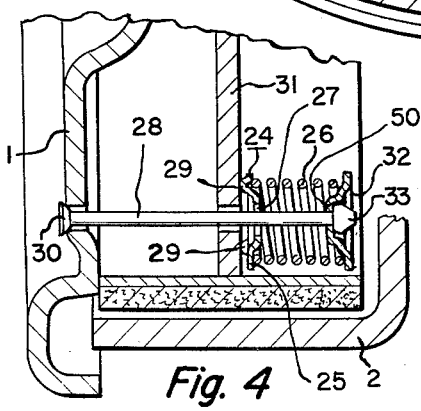
FIGURE 4 shows the coil spring and pin assembly for holding the brake shoe in its relative position to the backing plate.

The pin assembly in FIGURE 4 includes a pin 28 which has a rounded portion on the underside of the head 30 for engaging the backing plate 1. The pin 28 extends through the brake shoe webbing 31 and also through the opening 27 of the spring seat 24. The pin 28 further extends through the cap 32 and is held in a locked position. The head 33 of pin 28 being inserted through an oblong hole is then rotated to seat in a groove 50 of the cap 32 to hold the pin 28 and the cap 32 in a locked position. The pin assembly provides a limited area for contacting the brake shoe webbing 31.

FIGURE 5 shows the pin assembly including the leaf spring 35 engaging the pin 28. Pin 28 engages the backing plate 1 in the same manner as FIGURE 4. The pin also extends through the brake shoe webbing 31 and through the leaf spring 35. The pin 28 is inserted through both sections of the U-shaped leaf spring 35 and then rotated to seat itself within a groove to lock the spring 35 and the pin 28 in a non-rotated position.

FIGURE 6 shows a 3-dimensioned view of the U-shaped leaf spring 35. The lower portion of the U-shaped spring 35 is provided with an opening 44 for reception of pin 28. Three prongs or projections 36, 37 and 38 extend laterally from the lower arm 52 of the U-shaped spring 35. You will note that these three projections 36, 37 and 38 contact the brake shoe webbing as shown in FIGURE 5. These projections provide a limited contact surface and retard the heat transfer from the brake shoe webbing 31 to the spring 35. The leaf spring 35 is provided with a bend in the intermediate portion to form an upper arm 39 which engages the pin 28. You will note the opening 40 is elongated to receive a similarly shaped head 41 on pin 28. As the head 41 is inserted in the opening 40, it is rotated 90° and fits in the groove 42. This type of a structure maintains a non-rotative position between the pin 28 and the spring 35.

The arm 39 of the spring 35 is also provided with a laterally extending tab 43. This tab performs the function of limiting the contraction of the leaf spring. The purpose in limiting the contraction of the spring is to prevent overspringing and causing the spring to become deformed and consequently not providing the necessary resilience in holding the brake shoe. This tab provides a convenience in assembling the hold-down pin with the brake shoe and spring.

The invention operates in the following manner. The pin 28 is inserted through the backing plate and also through the brake shoe webbing 31. The pin 28 also extends through the spring 35 and the spring is contracted so tab 43 contacts the webbing 31 thereby permitting the head 41 to extend through the hole as the pin is rotated 90°. The head 41 locks within the groove 42 as the spring is permitted to expand to its normal position within the braking structure.

The coil spring assembly is placed within the braking structure in much the same manner. The pin extends through the backing plate 1 and the brake shoe webbing 31 as well as through the spring seat 24, the spring 26 and the cap 32. The spring 26 is depressed to permit the head 33 to extend beyond the opening in the cap 32. The cap 32 is then rotated 90° relative to the pin 33, thereby maintaining a non-rotative position between the spring cap 32 and the pin 38.

In the event that the vehicle brakes are operated severely, the brake becomes overheated. As the brake shoes and brake drum become heated, a portion of this heat is conducted to the webbing 31. As the webbing 31 becomes heated the limited contact between prongs 36, 37 and 38 retards the conduction of heat from the brake shoe webbing 31 to the spring 35. This provides a substantially lower operating temperature for the spring 35 and consequently, the annealing point of the metal is much less likely to be reached. This is also true in the case of the coil spring 26 as the three embossments 29 conduct considerably less heat than if the spring were mounted solidly on the brake shoe webbing 31.

This device provides for longer life of the hold-down springs and also more satisfactory operation of the springs within the braking device. Even though a limited resilience may be lost with the spring, this lack of resilience may prevent satisfactory operation of the brakes. A spring is less likely to fail where it does not become overheated.

While the embodiments of the present invention as herein disclosed constitute preferred forms, it is to be understood that other forms might be adopted.

What is claimed is as follows:

1. In a device of the character described comprising in combination; a vehicle brake backing plate, a pin mounted on said backing plate, a brake drum, a vehicle brake shoe for frictionally engaging said drum, a sheet metal spring having a longitudinal U-shaped cross section, said U-shaped spring having a first arm for engaging said pin, a laterally extending flange on said first arm extending toward the second arm of said U-shaped spring, said lateral flange permitting limited contraction of said spring thereby preventing contraction of said spring beyond its stress limit, a plurality of projections on said second arm of said U-shaped spring for engagement with said brake shoe on a limited area and thereby providing limited heat conduction from said brake shoe to said spring.

2. A device of the character described comprising in combination; a hold-down brake shoe pin assembly including a vehicle backing plate, a vehicle brake shoe, a brake drum for engaging said shoe, a pin mounted on said backing plate and extending through said shoe, a spring cap mounted on said pin, a spring seat contacting said brake shoe, means on said spring seat for limited engagement with said shoe, a coil spring compressibly mounted between said spring cap and said spring seat thereby maintaining resilient contact by said spring seat in a limited area of said brake shoe to retard heat transfer from said brake shoe to said spring.

3. In a vehicle drum brake a hold-down pin assembly comprising in combination; a brake backing plate, a vehicle brake shoe, a brake drum for engaging said brake shoe, a pin mounted on said backing plate and extending through said brake shoe, a spring seat having embossments engaging said brake shoe on a limited area, a spring resiliently mounted on said spring seat, a spring cap mounted on said pin, said pin extending through said spring seat, said spring and said spring cap and thereby retaining a resilient connection for maintaining the relative position of said brake shoe to said backing plate.

4. In a vehicle drum brake comprising in combination; a vehicle brake backing plate, a pin assembly supported on said backing plate including a pin, a brake shoe adapted for engagement with said pin assembly, a spring seat having embossments adapted for limited contact with brake shoe, a spring resiliently mounted on said spring seat, a spring cap connected to said pin and compressing said spring between said spring cap and said spring seat thereby providing limited conduction from said brake shoe to said spring through said spring seat.

5. In a device of the character described for use with a brake support member and a brake shoe comprising in combination, a pin adapted for mounting on a brake support member and adapted for extending through said brake shoe, a U-shaped flat spring, a first arm formed on said U-shaped spring for engaging said pin, a second arm formed on said U-shaped spring, a plurality of laterally extending projections on said second arm adapted for engaging said brake shoe on a limited portion to limit the transfer of heat from said brake shoe to said spring.

6. In a device of the character described for use with a brake support member and a brake shoe comprising in combination, a pin adapted for mounting on said support member, a U-shaped flat spring having a first and second arm, said first arm having a perforation for reception of said pin and for engaging said pin, said second arm having a perforation for reception of said pin, a plurality of projections extending laterally from said second arm for limited engagement with said brake shoe to provide a limited conduction of heat from said shoe to said spring.

7. In a device of the character described for use with a brake support member and a brake shoe comprising in combination, a pin adapted for mounting on said brake support member, a U-shaped flat spring having a first arm and a second arm, said first arm having a perforation for reception of said pin and resiliently engaging a portion of said pin when said pin is mounted on said brake support member, said second arm having a perforation for reception of said pin, a plurality of projections extending laterally from said second arm adapted for limited engagement with said brake shoe and thereby providing a limited heat conduction from said brake shoe to said spring.

References Cited in the file of this patent

UNITED STATES PATENTS

| | | |
|---|---|---|
| 1,954,538 | Sanford | Apr. 10, 1934 |
| 2,111,297 | Pontius | Mar. 15, 1938 |
| 2,263,949 | Harle | Nov. 25, 1941 |
| 2,287,238 | Goepfrich | June 23, 1942 |
| 2,544,030 | House | Mar. 6, 1951 |

FOREIGN PATENTS

| | | |
|---|---|---|
| 1,109,268 | France | Sept. 21, 1955 |